United States Patent
Huang et al.

(10) Patent No.: US 7,493,314 B2
(45) Date of Patent: Feb. 17, 2009

(54) SYSTEM AND METHOD FOR PROVIDING ACCESS TO COMPUTER FILES ACROSS COMPUTER OPERATING SYSTEMS

(75) Inventors: Jau-Hsiung Huang, Hsindian (TW); Wei-Hsin Tseng, Hsindian (TW); Hung-Te Chou, Shulin (TW); Yung-Chiuan Weng, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 430 days.

(21) Appl. No.: 11/032,440

(22) Filed: Jan. 10, 2005

(65) Prior Publication Data

US 2006/0155669 A1 Jul. 13, 2006

(51) Int. Cl.
*G06F 17/30* (2006.01)
(52) U.S. Cl. .............................. 707/3; 707/10; 707/100; 707/200; 718/100
(58) Field of Classification Search ..................... 707/3, 707/10, 100, 200; 713/2; 714/36, 42; 718/100
See application file for complete search history.

(56) References Cited

U.S. PATENT DOCUMENTS

| | | | |
|---|---|---|---|
| 5,548,759 A * | 8/1996 | Lipe ........................... 707/100 |
| 5,579,517 A | 11/1996 | Reynolds et al. |
| 5,745,902 A | 4/1998 | Miller et al. |
| 5,758,352 A | 5/1998 | Reynolds et al. |
| 6,081,826 A * | 6/2000 | Masuoka et al. ............. 718/100 |
| 6,088,794 A * | 7/2000 | Yoon et al. ...................... 713/2 |
| 6,286,013 B1 | 9/2001 | Reynolds et al. |
| 6,988,124 B2 * | 1/2006 | Douceur et al. ............. 709/203 |
| 7,209,967 B2 * | 4/2007 | Kitamura ..................... 709/225 |
| 2003/0101189 A1 * | 5/2003 | Lanzatella et al. .......... 707/100 |
| 2005/0210371 A1 * | 9/2005 | Pollock et al. ............. 715/509 |
| 2006/0112313 A1 * | 5/2006 | Tripp et al. .................... 714/36 |

FOREIGN PATENT DOCUMENTS

JP  2001-92696  4/2001

OTHER PUBLICATIONS

"File Systems;" File system summaries; pp. 1-7; http://www.osdata.com/holistic/connect/filesys.htm.
English language translation of abstract of JP 2001-92696.
English language translation of Japanese Office Action.

* cited by examiner

*Primary Examiner*—Pierre M Vital
*Assistant Examiner*—Fred I Ehichioya
(74) *Attorney, Agent, or Firm*—Thomas, Kayden, Horstemeyer & Risley (57) ABSTRACT

An across-file-system file access system and method for accessing files across different computer operating systems and file systems is disclosed. The across-file-system file access system includes a file resource table generator and a file resource table reader. The file resource table generator creates and up-dates a file resource table, which associates file markers for files stored in a given partition with the physical addresses of the files within the given partition. The file resource table generator is run on top of a first operating system, and the given partition is managed by a file system that uses a file system table. The file resource table reader run on top of a second computer operating system, which cannot access the file system table of the file system. The file resource table reader reads the file resource table to provide access to the files listed in the file resource table.

29 Claims, 5 Drawing Sheets

| FRT | 338 | |
|---|---|---|
| DRIVE: C  PARTITION: PARTN1 — 502 | | |
| FILE MARKERS 504 | ADDRESSES | 506 |
| MYSTUFF/PICS/VACATION/PIC1.JPG | (200, 385, 486) | |
| MYSTUFF/PICS/VACATION/PIC7.JPG | (288, 390) | |
| MYSTUFF/PICS/BIRTHDAY/PIC1.JPG | (444, 512, 1590) | |

SYSTEM AND METHOD FOR PROVIDING ACCESS TO COMPUTER FILES ACROSS COMPUTER OPERATING SYSTEMS

TECHNICAL FIELD

The present invention is generally related to a system and method for providing access to computer files and, more particularly, is related to a system and method for selectively providing access to computer files across computer operating systems.

BACKGROUND OF THE INVENTION

There exists many computer operating systems such as Windows operating systems (Windows 3.1™, Windows 95™, Windows 98™, Windows 2000™, Windows NT™, Windows XP™), Macintosh operating systems (Macintosh System 7™, Macintosh System 8™, Macintosh System 9™, Macintosh OSX™), Unix based operating systems (FreeBSD, IRIX, OpenBSD), Linux, and others.

Regardless of the computer operating system employed on a modern computer, a modern computer system typically includes a mass storage device for storing files. Frequently, the mass storage device has a single partition, but the mass storage device can also be subdivided into several partitions. A partition is managed by a file system, and the type of file system depends upon the computer operating system. Among other things, a file system determines the layout of files and metadata in the partition in terms of blocks, allocates blocks, handles read and write system calls, maintains buffer cache, and handles input/output operations for movements of blocks to/from the partition.

A computer operating system will generally support (read and write) several file systems, but generally no single computer operating system supports every file system. Thus, it is difficult to share and access files across different computer operating systems when the files are stored in a partition that is not supported by the different computer operating systems. For example, a computer running the Linux computer operating system cannot access files stored in a New Technology File System (NTFS), which is native to the Windows 2000™ computer operating system. Similarly, a computer running the Windows 2000™ computer operating system cannot access files stored in a Unix File System (UFS), which is native to the Linux computer operating system. Thus, a dual boot computer system that can boot-up in either Windows 2000™ or Linux, where the Windows 2000™ computer operating system uses a NTFSpartition and the Linux computer operating systems uses a UFSpartition, cannot access files stored in the NTFS partition when the computer system is running the Linux computer operating system nor access files in the UFSpartition when the computer system is running the Windows 2000 computer operating system.

Thus, a heretofore-unaddressed need exists in the industry to address the aforementioned deficiencies and inadequacies.

SUMMARY OF THE INVENTION

Embodiments of the present invention provide an across-file-system file access system and method for accessing files across different computer operating systems and file systems. Briefly described, in architecture, one embodiment of the system, among others, can be implemented as follows. A first computer system comprising a mass storage device, a processor, and a across-file-system file access means. The mass storage device has a first partition that is managed by a first file system having a first file system table, the first partition has a file stored therein. The processor executes a first computer operating system. The across-file-system file access means provides access to the file in the partition to a second computer system when the second computer system is executing a second computer operating system, wherein the second computer system cannot access the first file system table of the first file system when the second computer system is executing the second computer operating system.

Briefly described, in architecture, another embodiment of the system, among others, can be implemented as follows. A first computer system comprising a mass storage device, a processor, and an across-file-system file access means. The mass storage device has a first partition that is managed by a first file system having a first file system table. The processor executes a first computer operating system. The across-file-system file access means provides access to selected files in a second partition that is managed a second file system having a second file system table. The across-file-system file access means access the selected files without using the file system table of the second file system.

Embodiments of the present invention can also be viewed as providing methods for providing access to files across file systems. In this regard, one embodiment of such a method, among others, includes the steps of running a first computer operating system on a computer system; employing a first file system having a file system table to manage the partition; receiving file system information for the file; determining from the file system information whether to include at least a portion of the file system information in a file resource table; and making the file resource table accessible to a second computer system running a second computer operating system.

Embodiments of the present invention can also be viewed as providing methods for accessing files across file systems. In this regard, one embodiment, among others, of such a method, which is implemented in a first computer system that employs a first file system, the method for accessing a file stored in a partition of a mass storage device of a second computer system, wherein the partition of the mass storage device is managed by a second file system having a file system table, the method includes the steps of running the first computer operating system on the first computer system, wherein the first computer operating system cannot read the file system table of a second file system; reading a file resource table, the file resource table associating a file marker for the file with an address, the address being the physical address of the file within the partition, the file marker denoting a path in the second file system to the file; and using the file resource table to access the file.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

In accordance with embodiments of the invention, an across-file-system file access system includes a file resource table (FRT) generator and a FRT reader, which are provided to facilitate file sharing between file systems of different computer operating systems. The FRT generator runs on top of a first computer operating system (OS1) having a first file system. The FRT generator receives file information related to files in the first file system and generates a FRT that associates file markers with the physical addresses of the files in the first file system. In some embodiments, the FRT generator selectively associates file markers with the physical addresses of the files in the first file system.

The FRT reader runs on top of a second computer operating systems (OS2) having a second file system, which is different from the first file system, and the first file system is not accessible to OS2. The FRT reader enables the OS2 and applications running on top of OS2 to access files in the first file system by reading the FRT to determine the physical addresses of the files.

Figure 1:
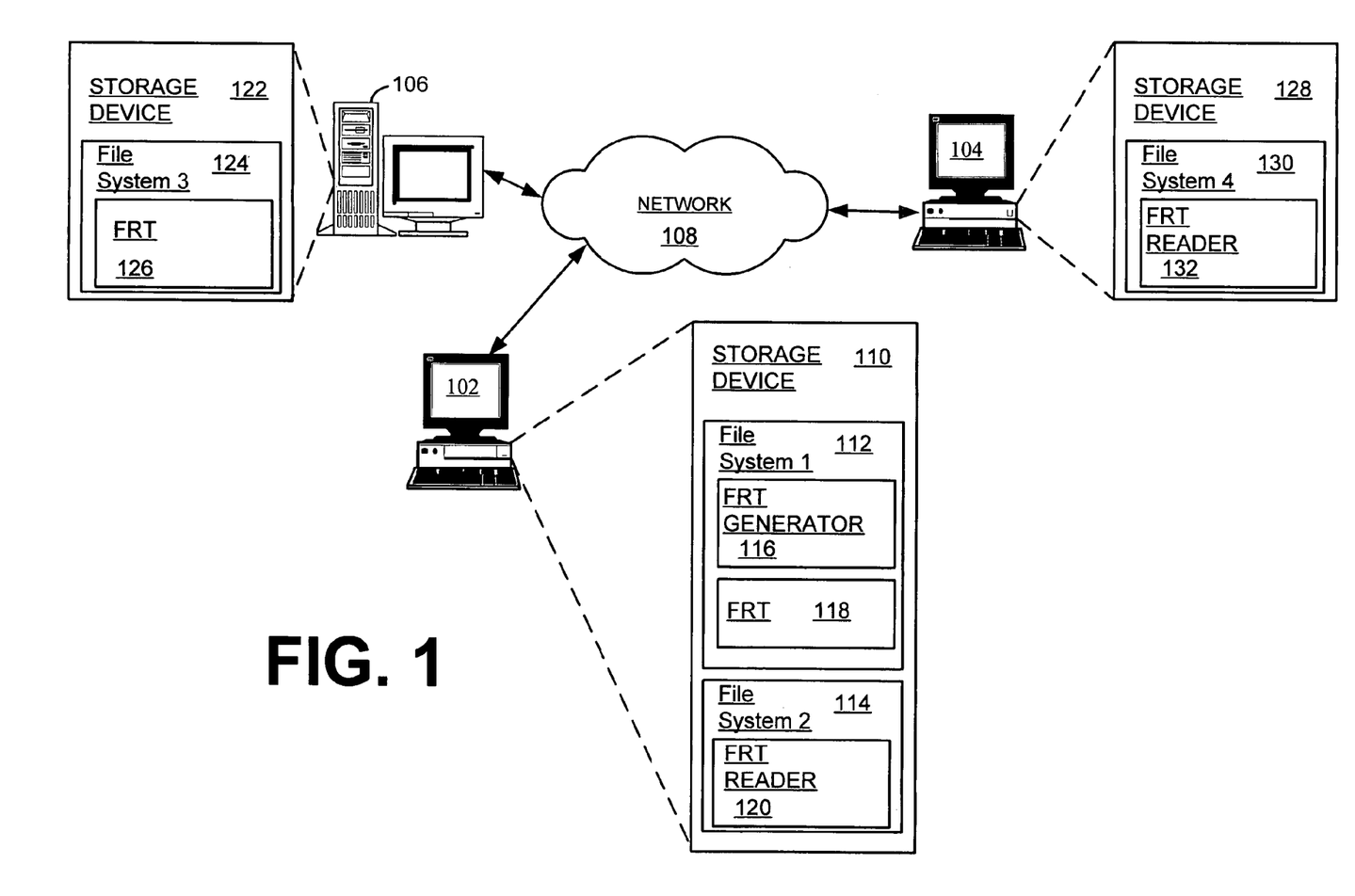
FIG. 1 is a diagram of networked computer systems.

Referring to FIG. 1, a first computer system 102 is coupled to a second computer system 104 and a third computer system 106 via network 108. The first computer system 102 is configured as a dual boot computer system and is adapted to boot-up in either a first computer operating system (OS1) or a second computer operating system (OS2). Non-limiting examples of computer operating systems include, but are not limited to, Microsoft Windows 95™, Microsoft Windows 2000™, Microsoft Windows XP™, Apple OS7™, Apple OS8™, Apple OS9™, Apple OSX™, UNIX, Linux, etc. The computer system 102 includes a storage device 110, which has a first file system (FS1) partition 112 and a second file system (FS2) partition 114. Non-limiting examples of file systems include, but are not limited to, New Technology File System (NTFS), File Allocation Table 32 bit (FAT32), Virtual File Allocation Table (VFAT), File Allocation Table (FAT), Common Internet File System (CIFS), and Server Message Block (SMB).

When the computer system 102 is booted up in OS1 mode, the FS1 partition 112 is mounted and accessible to OS1. In some embodiments, a FRT generator application 116 116 is stored in the FS1 partition 112. In OS1 mode, the FRT generator application is loaded into a memory 202 (FIG. 2) and executed by a processor 204 (FIG. 2) of the computer system 102. The FS1 partition 112 also includes a FRT 118, which associates files stored in the FS1 partition 112 with the addresses of the files.

When the computer system 102 is boot-up in OS2 mode, the FS2 partition 114 is mounted and accessible to OS2. In OS2 mode, the FS1 partition 112 may be mounted, but the FS1 partition 112 is generally inaccessible to applications running on top of OS2 because OS2 cannot read the FS1 partition 112 or write onto the FS1 partition 112. The FS2 partition 114 includes a FRT reader application 120. In OS2 mode, the FRT reader application 120 is loaded into the memory 202 (FIG. 2) and executed by the processor 204 (FIG. 2) of the computer system 102. When the FRT reader application 120 is being executed by the processor 204, the FRT reader uses the FRT 118 to determine the location of files on the FS1 partition 112, thereby providing the OS2 and applications running on top of OS2 access to files on the FS1 partition 112.

The computer system 106 includes a storage device 122, which includes a third file system (FS3) partition 124. The computer system 102 provides the computer system 106 with a FRT 126, which is then stored in the FS3 partition 124. Typically, the FS3 partition 124 is accessible to computer systems that run either OS1 or OS2 and/or other computer operating systems. Thus, the computer system 106 could be running OS1, OS2, or another computer operating system (OS3).

The computer system 104 includes a storage device 128 having a fourth file system (FS4) partition 130. The computer system 104 runs a computer operating system that cannot access files stored in the FS1 partition 112 of the computer system 102. The FS4 partition 130 of the computer systems 104 includes a FRT reader application 132, and using the FRT reader application 132, the computer system 104 can access the FRT 118 and/or the FRT 126. Once the computer system 104 has access either the FRT 118 or FRT 126, the computer system 104 can use the information within the FRT to access files on the FS1 partition 112.

Figure 2:
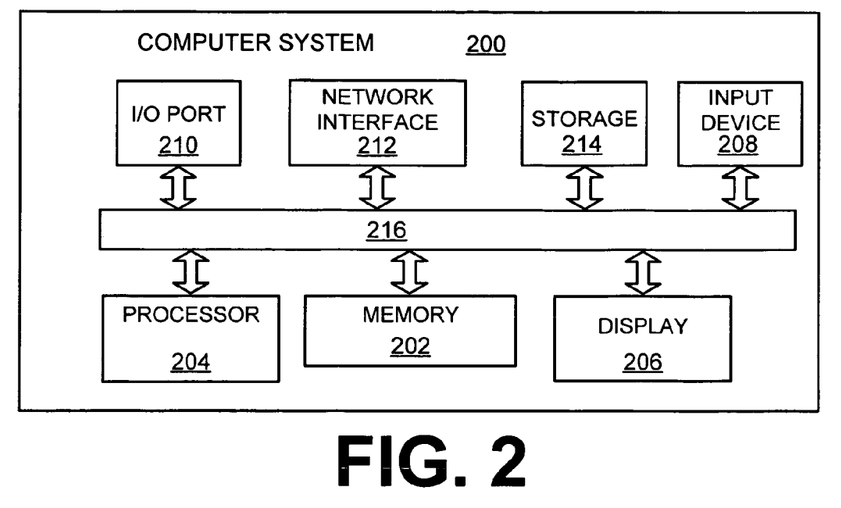
FIG. 2 a block diagram of a computer system.

FIG. 2 illustrates selected components of a computer system 200, which is representative of the computer systems 102, 104, and 106 and of other computing devices such as, but not limited to, personal digital assistants. The computer system 200 includes a display device 206 and an input device 208. Typically, the display device 206 is a computer monitor or a TV. The input device 208 is typically a keyboard and mouse through which the user provides user input.

The computer system 200 also includes an input/output port 210 and a network interface 212. The I/O port 210 is adapted to, among other things, couple to peripheral devices and provide a port for receiving and exporting information. The network interface 212 is adapted to couple to the network 108. The network interface comprises various components used to transmit and/or receive data over networks. By way of example, the network interface 212 may include a device that can communicate with both inputs and outputs, for instance, a modulator/demodulator (e.g., a modem), a wireless (e.g., radio frequent (RF)) transceiver, a telephonic interface, a bridge, a router, a network card, etc.

The computer system 200 also includes a storage device 214 and a bus 216. The storage device 214 can be a hard drive, well-known to those skilled in the art, and is used for storing content, applications, operating systems, among other things. The bus 216 provides a communication link between the components of the computer.

When the computer 200 is booted up, a computer operating system is loaded into the memory 202 and applications such as the FRT generator application 116 can also be loaded into the memory 202. The memory 202 can include any one of a combination of volatile memory elements (e.g., random-access memory (RAM, such as DRAM, and SRAM, etc.). The processor 204 executes the operating system loaded into the memory 202 and other programs and applications loaded into the memory 202.

Figure 3:
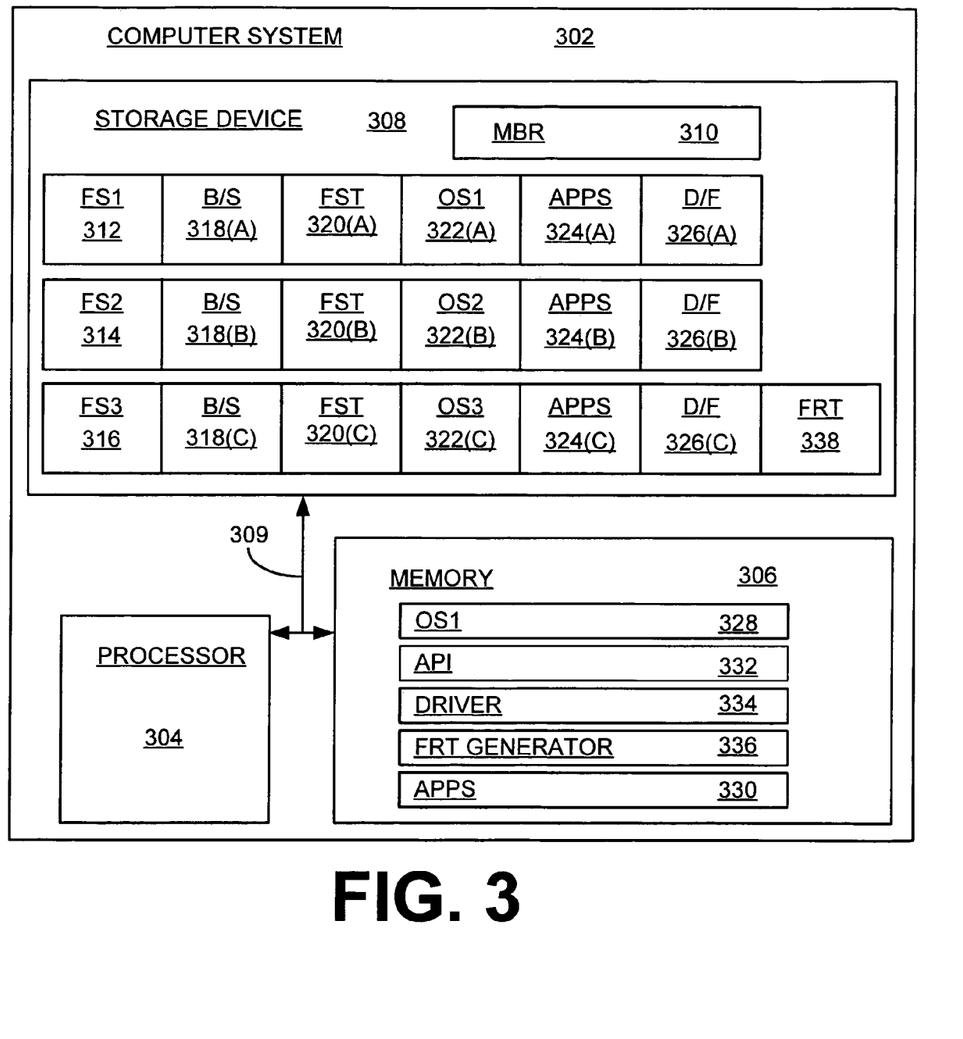
FIG. 3 is a block diagram of a dual boot computer system.

FIG. 3 is a block diagram of selected components of a computer system 302 that is configured to boot up in one of multiple computer operating systems. The computer system 302 is representative of the computer systems 102, 104, and 106. The computer system 302 includes a processor 304, a memory 306, and a storage device 308, all of which are in communication via a bus 309. The storage device 308 is typically a hard drive. In this embodiment, the storage device 308 is a single storage device having three logical partitions: FS1 partition 312, FS2 partition 314, and FS3 partition 316. In other embodiments, the computer system 302 might include other storage devices having one or more partitions.

The storage device 308 includes a master boot record (MBR) 310. The master boot record 310 typically resides in the first sector of the storage device 308 and is executed by the processor 304 during the boot up process of the computer system 302. The MBR 310 determines which storage partition of the computer system 302 to use for booting up the computer system 302.

In this embodiment, the FS1 partition 312, FS2 partition 314 and the FS3 partition 316 each include a boot sector (B/S) 318(a), 318(b), and 318(c), respectively; File System Tables (FST) 320(a), 320(b), and 320(c), respectively; computer operating systems OS1 322(a), OS2 322(b), and OS3 322(c), respectively; applications 324(a), 324(b), and 324(c), respectively; and data files (D/F) 326(a), 326(b), and 326(c), respectively. The boot sectors 318(a), 318(b), and 318(c) include software executed by the processor 304 for booting up the computer system 302 in OS1 322(a), OS2 322(b), or OS3 322(c), respectively.

In some embodiments, the FS3 partition 316 does not include the B/S 318(c) and OS3 322(c). The FS3 partition 316 is a file system that is accessible (readable and writeable) by both of the OS1 322(a) and the OS2 322(b) when the computer system 302 is booted up in either the OS1 mode or OS2 mode.

The FST 320(a) is used for, among other things, managing file storage of files within the FS1 partition 312 and for accessing files stored within the FS1 partition 312. The FST 320(a) associates files stored within the FS1 partition 312 with the physical addresses of the files. Thus, the FST 320(a) associates, among other things, applications 324(a) and data files 326(a) with their physical addresses in the FS1 partition 312. The FST 320(b) and FST 320(c) are used for, among other things, managing file storage of files within the FS2 partition 314 and FS3 partition 316, respectively, and for accessing files stored within the FS2 partition 314 and FS3 partition 316, respectively.

The memory 306 illustrates the memory of the computer system 302 responsive to the computer system being booted up in OS1 and applications 324(a) being launched. Loaded in memory 306 is an executing OS1 module 328 and executing application modules 330. Operating on top of the OS1 module 328 are application program interfaces (APIs) 332 and drivers 334. The API's 332 enable executing application modules 330 to interface with the OS1 module 328. The drivers 334 operate on top of the executing OS1 module 328 and, among other things, provide communications to the storage device 308 and the executing OS1 module 328.

A file resource table (FRT) generator module 336 runs on top of the OS1 module 328. The FRT generator module 336 creates a file resource table (FRT) 338 that, among other things, associates files with the physical address(es) of the files. (A fragmented file is stored over several non-contiguous blocks, and each block has a physical addresses). The FRT generator module 336 uses the API's 332 to, among other things, monitor user input and OS1 module 328 activity and maintain an up-to-date FRT 338. In this embodiment, the FRT generator module 336 stores and maintains the FRT 338 in FS3 partition 316. In other embodiments, the FRT 338 can be stored in other locations such as the FS1 partition 312 or another partition (not shown) including a partition of a networked computer system.

In this embodiment, the FS3 partition 316 is accessible to any of the computer operating systems OS1 322(a), OS2 322(b), and OS3 322(c). In other words, no matter which of the computer operating systems the computer systems 302 is booted up in, the FS3 partition 316 is accessible (readable and writeable) to the currently executing computer operating system. For example, in one embodiment, among others, the OS1 322(a) is a Microsoft computer operating system such as, but not limited to, Windows 2000™ and the OS2 322(b) is, among others, Linux, and the FS1 partition 312 is a NTFS partition, the FS2 partition is a Unix File System (UFS) partition, and the FS3 partition is a File Allocation Table (FAT) partition, which is accessible to both Windows 2000™ and Linux. The FRT 338 associates files in the FS1 partition 312 with their physical addresses within the FS1 partition 312.

In some embodiments, the FRT 338 is stored in a continuous space in FS1 partition 312, and a pointer is written into the master boot record 310. The pointer is used to provide the location of the FRT 338 to the OS2 322(b) and/or OS3 322(c) when the computer system 302 is booted in either OS2 322(b) or OS3 322(c).

Figure 4:
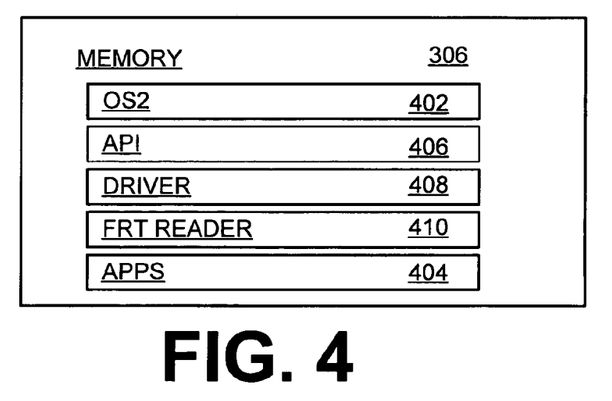
FIG. 4 is a block diagram of a computer system's memory.

FIG. 4 illustrates the memory 306 when the computer system 302 is booted to run the OS2 322(b). An OS2 module 402 is loaded in memory 306 and executed by the processor 304. Also loaded in the memory 306 are application modules 404, API's 406, drivers 408 and an FRT reader module 410. The application modules 404 correspond to executables of applications 324(b) that are running on top of the OS2 module 402.

The API's 406 provide interface functionality between the OS2 module 402 and the application modules 404. The drivers 408, among other things, provide communications between the OS2 module 402 and devices including peripheral devices.

The FRT reader module 410 is run on top of the OS2 module 402 and reads the FRT 338. The FRT 338 is formatted according to predetermined protocols known to the FRT reader module 410. In this embodiment, the FS2 partition 314 and FS3 partition 316 are mounted when the computer system 302 is booted to run the OS2 module 402. Thus, the FRT reader module 410 uses the FST 320(c) to locate and read the FRT 338. If the FRT 338 had been stored in the FS1 partition 312, the FRT reader module 410 would look for a pointer to the FRT in the MBR 310. Generally, the FRT reader module 410 includes logic for finding the FRT by, among other things, reading FST's of accessible partitions, looking for a pointer in a known location such as the MBR 310, and looking for the FRT in known locations such as on partitions of networked devices.

A module such as, but not limited to, the FRT generator module 336 or the FRT reader module 410, and any sub-modules, may comprise an ordered listing of executable instructions for implementing logical functions. When a module and/or any sub-modules are implemented in software, it should be noted that the modules can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The FRT generator module 336 and the FRT reader module 410, and any sub-modules can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any appropriate mechanism that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, FEPROM, or Flash memory) (electronic), an optical fiber (optical), and a portable compact disc read-only memory (ODROM) (optical).

Figure 5:
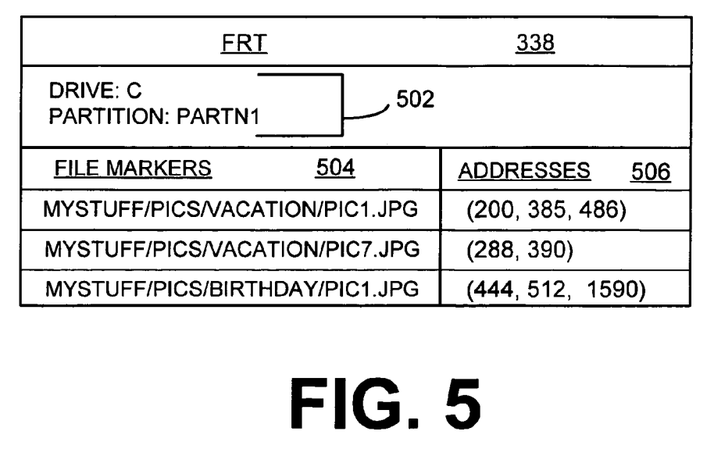
FIG. 5 is a block diagram of a file resource table.

Referring to FIG. 5, the FRT 338 associates files with physical addresses of the files. The FRT 338 includes partition information 502, file marker information 504, and address information 506. The partition information 502 includes a partition name and a device name. The partition name is the name of the partition for which the FRT has been created and the device name is the name of the device having that partition. Each file marker 502 denotes a file name and a path to that file. For example, "MYSTUFF/PICS/VACATION/" is the path within "PARTN1" of drive "C" to files named "PIC1" and "PIC7", and "MYSTUFF/PICS/BIRTHDAY/" is the path to a file named "PIC1".

In some embodiments, the file marker 504 can include the device name and partition name such that the path to a file is a complete path. In that case, the FRT can be used to denote files across several partitions including partitions of different drives. For example, instead of the file marker being "MYSTUFF/PICS/BIRTHDAY/PIC1", the file marker would be "C/PARTN1/MYSTUFF/PICS/BIRTHDAY/PIC1".

Each file marker 504 is associated with address information 506 that provides the physical address associated with the file. The physical address information 504 for a file can include a single address or for the case of a fragmented file, an address for each fragment. The file "MYSTUFF/PICS/VACATION/PIC1" is a fragmented file stored in sectors 200, 385, and 486 of the file system partition "PARTN1".

Figure 6:
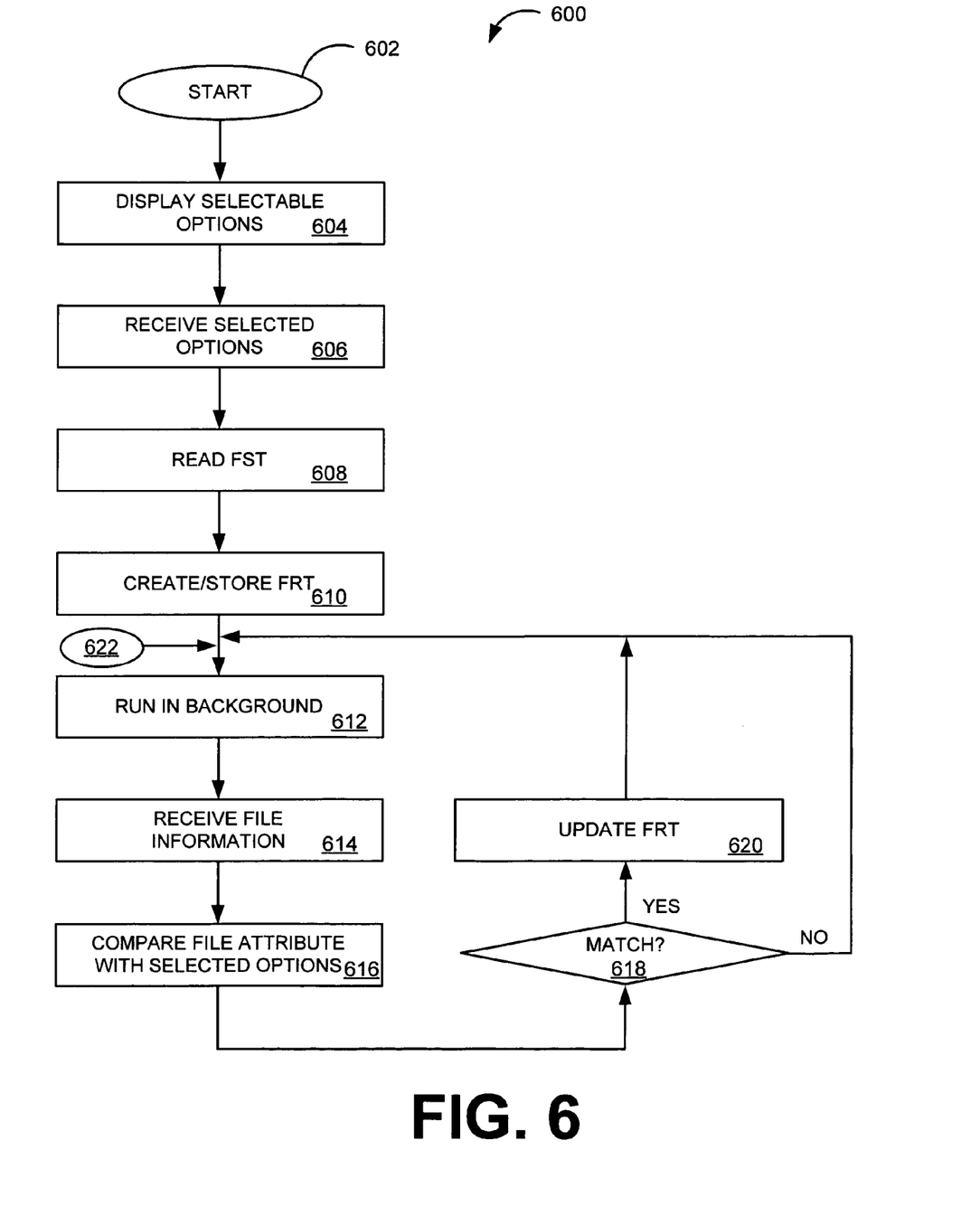
FIG. 6 is a flow chart depicting a method employed by a file resource table generator.
Figure 7:
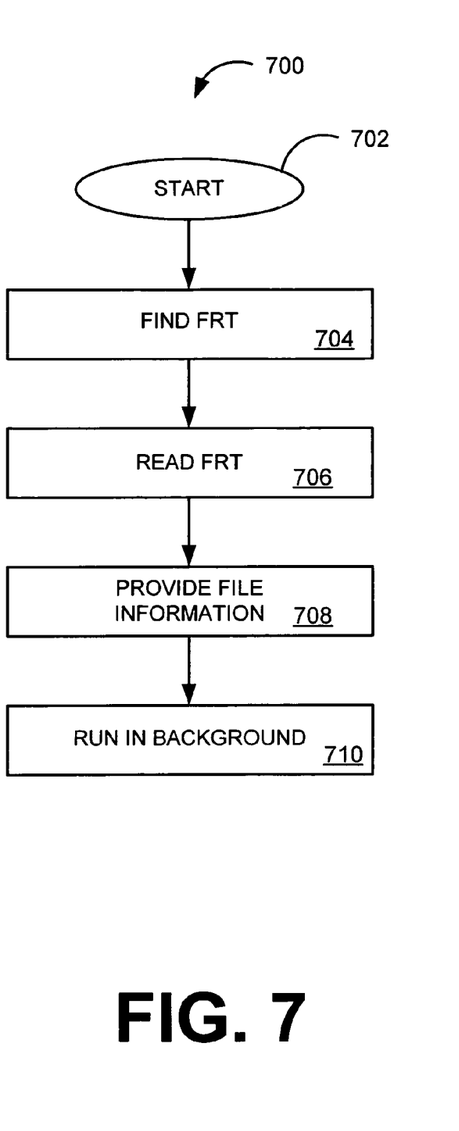
FIG. 7 is a flow chart depicting a method employed by a file resource table reader.
Figure 8:
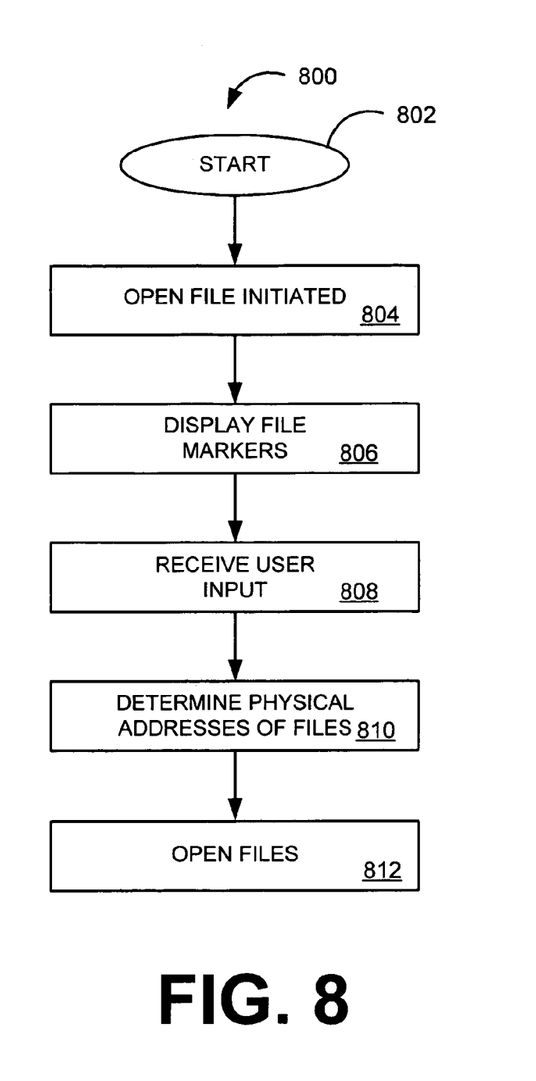
FIG. 8 is a flow chart depicting a method of using a file resource table.

FIGS. 6-8 are flow charts of steps that may be taken by the computer system 302. The flow charts show the architecture, functionality, and operation of a possible implementation of, among other things, the FRT generator 336 and the FRT reader module 410. In this regard, each block represents a module, segment, or portion of code, which comprises one or more executable instructions for implementing the specified logical function(s). It should also be noted that in some alternative implementations, the functions noted in the blocks may occur out of the order noted in FIGS. 6-8. For example, two blocks shown in succession may in fact be executed substantially concurrently or the blocks may sometimes be executed in the reverse order, depending upon the functionality involved, as will be further clarified hereinbelow.

Steps 600, which are illustrated in FIG. 6, are illustrative of exemplary steps performed by the FRT generator 336. In step 602, the process is started, and in step 604, user-selectable options are displayed to the user. The user-selectable options may depend upon the type of operating system upon which the FRT generator is running. Exemplary user options or user-selectable options include file type and date of creation. Exemplary file types include document, picture, etc., which are frequently denoted by an extension appended to a file name such as ".jpg" for a picture. The user can use date of creation to exclude files that have a creation date preceding the user-specified date or can use the date of creation to exclude files that have a date of creation after the specified date of creation. Depending upon the type of operating system and the type of file system operating on top of the operating system, files can have other attributes such as project, versioning, group, privilege set, hidden/normal, and/or owner among other attributes. The user can select options among various file attributes to exclude or include files in the FRT. In step 606, the user selected options are received by the FRT generator 336, and in step 608, the FRT generator 336 reads the FST 320(a).

In step 610, the FRT generator 336 uses the user-selected options (file attributes and, in some embodiments, other options provided by the user) and the information from the FST 320 to create the FRT 338, and store the FRT 338 in the FS3 partition 316. The FST 320(c) is updated to include the FRT 338. In some embodiments, the FRT 338 is stored in the FS1 partition 312, and in that case, a pointer to the FRT 338 is created and stored in a location that is available to the OS2 322(b). An exemplary location accessible to the OS2 322(b) include, but is not limited to, the MBR 310. Similarly, the FRT 338 could be stored in a partition of a networked device so that the FRT 338 will be accessible to the OS2 322(b).

In step 612, the FRT generator 336 runs on top of the OS1 module 328 in the background. The user can bring the FRT generator 336 to the foreground to, among other things, change options if the user so desires. Running in the background, the FRT generator 336 monitors processes to determine whether any files stored in FS1 partition 312 has been touched, i.e., whether the file has been created, edited, saved, or modified, etc., by an application that is running on top of the OS1 module 328.

In step 614, the FRT generator receives file information. The FRT generator 336 uses API's 332 to monitor processes running on processor 304. When a file in FS1 partition 312 is touched by an application module 330, the FRT generator 336 receives the file information regarding the touched file. The received file information includes, among other things, the address or addresses of the touched file, the path for the file, and various file attributes such as the file type, e.g., picture, document, etc.

In step 616, the FRT generator 336 compares the received file attributes with the user-selected options, and in step 618, the FRT generator 336 determines whether there is a match with the file attributes and the user-selected options. If there is a match, then in step 620, the FRT generator 336 updates the FRT 338. Typically, updating the FRT 338 includes adding file marker information 504 and associated address information 506 for a newly created file which has file attributes that match the user-selected options and modifying the address information 506 for a file that is already listed in the FRT 338. On the other hand, if there is no match, the FRT generator continues to step 610 where it runs in the background on top of OS1 module 328.

Typically, when the computer system 302 is booted up in OS1 mode and the FRT generator 336 has been executed at least once before so that there is a FRT 338, the FRT generator 336 is activated as part of the boot up procedure of the OS1 module 328 and runs in the background. When the FRT generator 336 is activated as part of the boot-up procedure, the procedure starts at step 622.

Steps 700, which are illustrated in FIG. 7, are illustrative of exemplary steps performed by the FRT reader module 410. In step 702, the process is started, and in step 704, the FRT 338 is located. In some embodiments, the FRT reader module 410 provides a user-interface to the user for allowing the user to input information for locating the FRT 338. For example, the user might select a networked machine or a drive or a partition as having the FRT. In other embodiments, the FRT reader module 410 includes the logic for searching for the FRT 338. For example, the FRT reader module 410 could read the FST of each of accessible partition to locate the FRT and/or look for a pointer to the FRT.

In step 706, the FRT reader module 410 reads the FRT 338. Upon reading the FRT 338, knowledge about the physical addresses of files in the FS1 partition 312 is obtained. In step 708, the FRT reader module 410 interfaces with application modules 404 running on top of the OS2 module 402 to provide file information to application modules 404.

In step 710, the FRT reader module 410 runs in the background on top of the OS2 module 402.

Steps 800, which are illustrated in FIG. 8, are illustrative of exemplary steps performed by an application module 404 running on top of the OS2 module 402. In step 802, the process is started, and in step 804, the application module 404 initiates the opening of a file. Typically, the user interacts with the executing application module 404 so as to cause the application module 404 to open a file. Typically, application module 404 provides the user with a window in which the user can select files by browsing through file systems. If the user selects the FS1 partition 312, then the FRT reader module 410 provides a list of file markers 504 to the application module 404, which then displays the file markers or the names of the files to the user. Frequently, information is conveyed to the user in a "folder" structure, i.e., the files and sub-folders of a folder are displayed to the user.

The user can then select a file, or more than one file to open, and in step 808, the application module 404 receives user-input designating a selected file or selected files to open. In step 810, the FRT reader module 410 determines the physical addresses of the file or files. Then, in step 812, the selected file or files are opened.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. In a first computer system, a method of providing access to a file stored in a partition of a mass storage device of the first computer system, the method comprising the steps of:
   running a first computer operating system on the first computer system;
   employing a first file system having a file system table to manage the partition, wherein a second computer operating system cannot read the file system table of the first file system;
   receiving file system information for the file, wherein the file system information for the file comprises a physical address associated with a block;
   determining from the file system information whether to include at least a portion of the file system information in a file resource table, the file resource table associating a file marker for the file with a physical address of the file within the partition, and the file resource table is employed by a file system other than the first file system; and
   making the file resource table accessible to the second computer system running a second computer operating system, wherein the step of making the file resource table accessible comprises providing a pointer to the file resource table, and the file resource table is configured to be read by a file resource table reader being run on top of the second computer operating system.

2. The method of claim 1, further including the step of:
   running a file resource table generator on top of the first computer operating system, wherein the file resource table generator receives the file system information and generates the file resource table.

3. The method of claim 2, wherein the file resource table generator is run on top of the first computer operating system in the back ground.

4. The method of claim 2, further including the step of:
   providing the file resource table generator with criteria for determining whether to include the file in the file resource table.

5. The method of claim 2, wherein the file resource table generator uses application program interface modules to receive file system information.

6. The method of claim 1, wherein the determination on whether to include the file in the file resource table is based at least in part upon the file-type of the file.

7. The method of claim 1, wherein the step storing the file resource table in a second partition that is managed by a second file system, wherein the second partition is readable by the second computer operating system, and the second file system is different from the first file system.

8. The method of claim 7, wherein the first computer system and the second computer system are different computer systems, and the first computer operating system is different from the second computer operating system.

9. The method of claim 1, wherein the pointer is accessible to the second computer operating system.

10. The method of claim 9, wherein the first computer system and the second computer system are the same computer systems.

11. The method of claim 1, wherein the first computer system is configured as a dual boot computer system adapted to boot either the first computer operating system or a second computer operating system.

12. In a first computer system having a first partition that employs a first file system using a first file system table, a method of accessing a file stored in a second partition of a mass storage device of a second computer system, wherein the second partition of the mass storage device is managed by a second file system having a second file system table, the method comprising the steps of:
   running a first computer operating system on the first computer system, wherein the first computer system is configured as a dual boot computer system adapted to boot either the first computer operating system or a second computer operating system, wherein the first computer operating system cannot read the second file system table of the second file system of the second computer system;

reading a file resource table, the file resource table associating a file marker for the file with an address, the address being the physical address of the file within the second partition of the second computer system, the file marker denoting a path in the second file system to the file stored in the second partition of the second computer system and wherein the file resource table is employed by a file system other than the first file system;

using the file resource table to access the file stored in the second partition of the second computer system; and running a file resource table reader on top of the first computer operating system in the background, wherein the file resource table reader reads the file resource table.

13. The method of claim 12, further including the step of:
finding a pointer to the file resource table, wherein the file resource table is stored within the second file system, and the pointer is stored in a location that is outside of the second file system.

14. The method of claim 12, further including the step of:
determining a location of the file resource table.

15. The method of claim 14, wherein the step of determining the location of the file resource table further includes the steps of:

accessing a third partition, the third partition being managed by a third file system having a third file system table, wherein the third partition is accessible to both the first computer system and the second computer system; and reading the third file system table, wherein the third file system table associates the physical address of the file resource table with the file resource table.

16. The method of claim 15, wherein the first and second computer systems are the same computer system.

17. A program embodied in a computer readable storage medium, the program comprising:

logic configured to receive file system information for a file stored in a partition managed by a first file system having first file system table, wherein the first file system is compatible with a first computer operating system;

logic configured to determine from the file system information whether to include at least a portion of the file system information in a file resource table; wherein the file resource table associating a file marker for the file with a physical address of the file within the partition, and the file resource table is employed by a file system other than the first file system logic configured to make the file resource table accessible to a second computer system running a second computer operating system including logic configured to provide a pointer to the file resource table;

logic configured to run a file resource table generator on top of the first computer operating system, wherein the file resource table generator receives the file system information and generates the file resource table, and logic configured to run a file resource table reader on top of the second computer operating system, wherein the file resource table reader is configured to read the file resource table.

18. The program of claim 17, wherein the file resource table generator is run on top of the first computer operating system in the back ground.

19. The program of claim 17, further including:
logic configured to provide the file resource table generator with criteria for determining whether to include the file in the file resource table.

20. The program of claim 17, wherein the file resource table generator uses application program interface modules to receive file system information.

21. The program of claim 17, wherein the determination on whether to include the file in the file resource table is based at least in part upon the file-type of the file.

22. The program of claim 17, wherein the file resource table is employed by a file system other than the first file system.

23. The program of claim 17, wherein logic configured to make the file resource table accessible includes logic configured to store the file resource table in a second partition that is managed by a second file system, wherein the second partition is readable by the second computer operating system, and the second file system is different from the first file system.

24. The program of claim 23, wherein the first computer system and the second computer system are different computer systems, and the first computer operating system is different from the second computer operating system.

25. The program of claim 17, wherein the pointer is accessible to the second computer operating system.

26. The program of claim 25, wherein the first computer system and the second computer system are the same computer systems.

27. The program of claim 17, wherein the file system information for the file comprises a physical address associated with a block.

28. A program embodied in a computer readable medium, the program comprising:

logic configured to read a file resource table, wherein the file resource table is employed by a file system other than the first file system, the file resource table associating a file marker for a file with an address, the address being the physical address of the file within a partition managed by a file system having a file system table, the file marker denoting a path in the second file system to the file;

logic configured to use the file resource table to access the file;

logic configured to determine a location of the file resource table including logic configured to access a second partition, the second partition being managed by a third file system having a second file system table, wherein the second partition is accessible to both the first computer and the second computer;

logic configured to read the second file system table, wherein the second file system table associates the physical address of the file resource table with the file resource table;

logic configured to find a pointer to the file resource table, wherein the file resource table is stored within the partition, and the pointer is stored in a location that is outside of the partition; and logic configured to run a file resource table reader on top of a first computer operating system in the background, wherein the file resource table reader reads the file resource table.

29. The program of claim 28, wherein the first and second computer systems are the same computer system.

* * * * *